United States Patent

[11] 3,621,281

[72] Inventor Thomas E. Hagen
Saugerties, N.Y.

[21] Appl. No. 857,521
[22] Filed Sept. 12, 1969
[45] Patented Nov. 16, 1971
[73] Assignee Ferroxcube Corporation of America
Saugerties, N.Y.

[54] LINEAR RISE AND FALL TIME CURRENT GENERATOR
4 Claims, 2 Drawing Figs.

[52] U.S. Cl. .......... 307/228, 307/261, 328/181, 328/183
[51] Int. Cl. .......... H03k 3/00, H03k 4/06
[50] Field of Search .......... 307/228, 261, 270; 328/181, 183, 184

[56] References Cited
UNITED STATES PATENTS

| | | | |
|---|---|---|---|
| 2,602,151 | 7/1952 | Carbrey | 328/183 X |
| 3,263,093 | 7/1966 | Erdmann | 307/228 |
| 3,395,293 | 7/1968 | Perloff | 328/183 X |
| 3,402,353 | 9/1968 | Hubbs | 307/261 X |
| 3,440,448 | 4/1969 | Dudley | 307/228 X |
| 3,441,874 | 4/1969 | Bennett | 328/183 X |

OTHER REFERENCES

Pub. I, " Triangle Generator Adjusts Output Slopes and Peaks," by R. Zane, in Electronics, June 14, 1965, pp. 85 & 86

*Primary Examiner*—Stanley D. Miller, Jr.
*Attorneys*—Frank R. Trifari

ABSTRACT: A current source having a linear rise and fall time which uses a pair of oppositely polarized constant current sources connected to a capacitor to control an emitter follower and a common base amplifier. Alternately activating and deactivating one of the constant current sources produces a linear rise and fall in the charge on the capacitor, which is reflected in a linear rise and fall in the output current of the common base amplifier.

PATENTED NOV 16 1971 3,621,281

INVENTOR.
THOMAS E. HAGEN

BY

AGENT

LINEAR RISE AND FALL TIME CURRENT GENERATOR

The invention relates to signal generators, and in particular to signal generator for producing a triangular waveform with a substantially linear rise and fall time into a reactive load.

In order to minimize transients during the interrogation of a magnetic memory it is generally advantageous to drive the magnetic memory elements with a gradually rising or falling current.

It is therefore a primary object of the invention to provide a generator for driving a variable lead with a substantially transient free waveform.

This object was achieved by providing a triangular waveform generator using a pair of connected constant current generators to alternately charge and discharge a capacitor. The rising and falling charge on the capacitor is converted into a load insensitive rising and falling current in a dual stage amplifier, consisting of an emitter follower stage and a grounded base amplifier stage.

Figure 1:
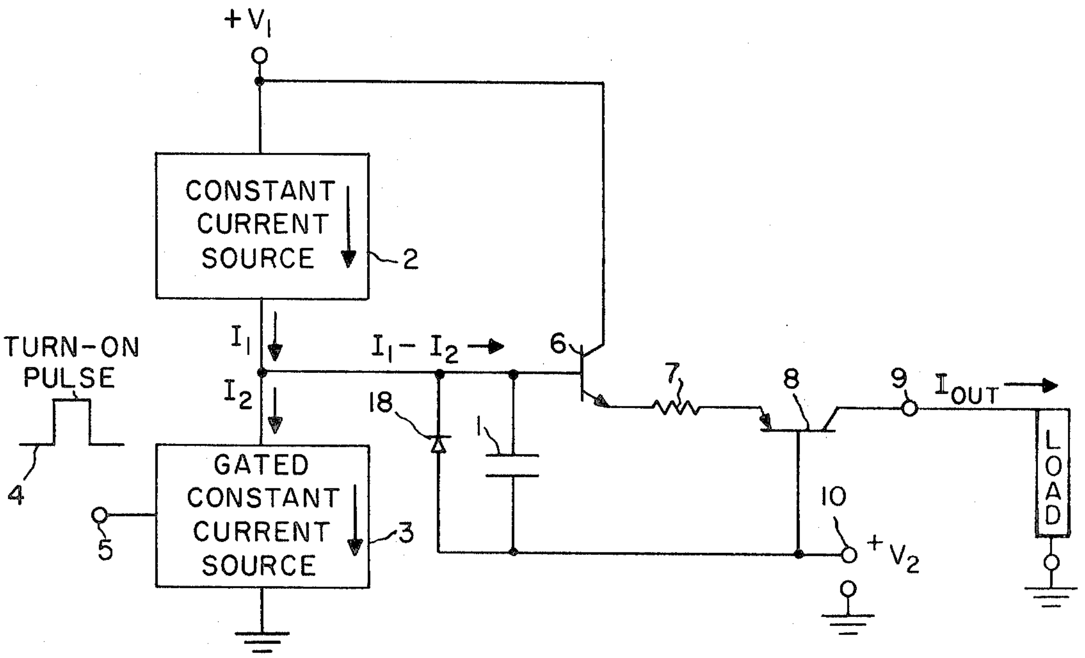
FIG. 1 is a schematic diagram of a preferred embodiment of the invention.

In FIG. 1 a first constant current source 2 and a gated constant current source 3 are connected to an integrating capacitor 1. The first constant current source 2 provides a constant charging current $I_1$ to the capacitor 1, while the gated constant current source 3 provides an intermittent discharging current $I_2$ to the capacitor in response to a turn-on pulse 4 applied to terminal 5. The absolute valve of $I_2$ is greater than that of $I_1$ causing the second current source 3 to absorb the output of source 2 while linearly draining the capacitor 1, resulting in a triangular voltage variation across the capacitor $C_1$ with respect to time. The capacitor is connected to the base of a transistor 6. A resistor 7 and the emitter-base path of a second transistor 8 are connected in series with the emitter of transistor 6. Transistor 6 thereby operates as an emitter follower, and provides a current to the emitter of transistor 8 corresponding to the voltage on the capacitor 1. A bias voltage $+V_2$ connected to the base of transistor 8 causes transistor 8 to operate as a common base amplifier supplying current I OUT to a load through a terminal 9. A diode 18 connected in parallel with the capacitor 1 prevents the voltage at the base of transistor 6 from reversing polarity, since this would introduce a delay in the response of transistor 6 to the removal of the turn-on pulse 4.

Figure 2:
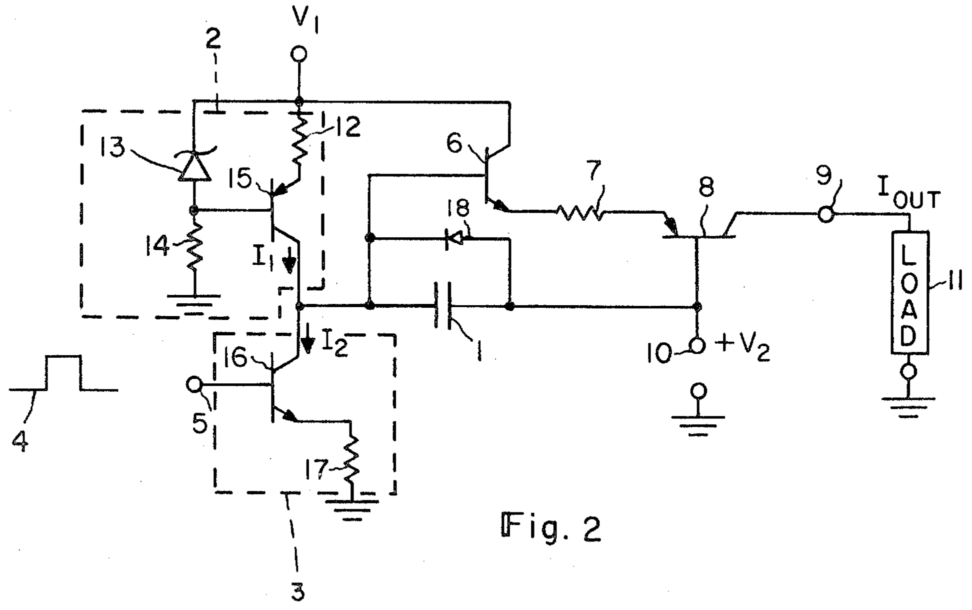
FIG. 2 is a schematic diagram showing two possible constant current sources for use with the invention.

In FIG. 2 the details of the constant current sources 2 and 3 are shown.

In source 2 a zener diode 13 and a resistor are connected as a voltage divider to a bias voltage $V_1$. The zener diode 13 is connected through a resistor 12 to a base-emitter path of a transistor 15, and supplies a constant current through the resistor 12 and transistor 15. This constant current results in a constant current $I_1$ through the collector terminal of the transistor 15.

In source 3 the uniform voltage of the turn-on pulse 4 connected to the base terminal of transistor 16 maintains the current $I_2$ through the collector-emitter terminals of the transistor 16 constant for the duration of the turn-on pulse. Obviously a modification of the current source 2 may be used as the current source 3 in the event that the turn-on pulse 4 is nonuniform.

What is claimed is:

1. Apparatus for providing linearly rising and falling currents for a variable impedance load, comprising first current source means for providing a constant current to an output terminal of said first current source means, second current source means for providing a constant current of a greater magnitude and in the opposite sense of said current from said first current source means to an output terminal of said second current source means in response to a turn-on pulse, integrating means connected to the output terminal of said first and said second current sources for converting the currents from said first and said second current source means into a linearly rising and falling voltage, and amplifier means connected to said integrating means for converting said voltage from said integrating means into a linearly rising and falling current, said amplifying means comprising a first transistor having a base, an emitter, and a collector terminal, means for connecting said base terminal of said first transistor to said integrating means, means for connecting said collector of said first transistor to a first bias voltage, a second transistor having a base, an emitter and a collector terminal, means for connecting the base of said second transistor to a second bias voltage, a resistor, and means for connecting the emitter terminal of said first transistor to said load through said resistor and said emitter and collector terminals of said second transistor.

2. Apparatus as claimed in claim 1 wherein said integrating means comprises a capacitor, means for connecting one side of said capacitor to said second bias voltage and means for connecting the other side of said capacitor to the base terminal of said first transistor and to the output terminals of said first and said second current sources.

3. Apparatus as claimed in claim 2 wherein said integrating means further comprises a diode connected across said capacitor and having a forward direction of conductivity opposing the forward direction of conductivity of the base to emitter path of said first transistor.

4. Apparatus as claimed in claim 1, wherein said first current source comprises a third transistor having base, emitter and collector terminals, a zener diode connected across the base and emitter terminals of said third transistor, and means for connecting the collector terminal of said third transistor to said output terminal of said first current source.

* * * * *